Aug. 6, 1957     A. I. BRATTON     2,801,906
SUPPORT FOR WIRE FILAMENT
Filed Dec. 9, 1954     2 Sheets-Sheet 1
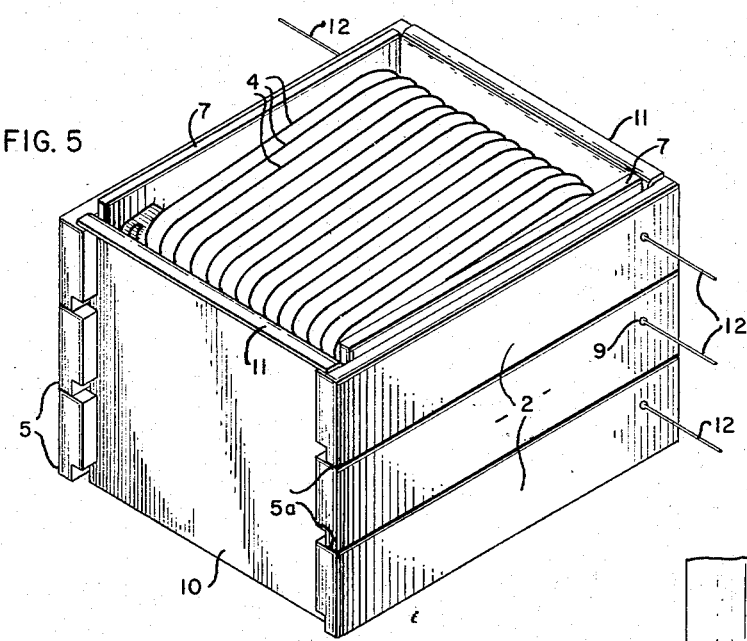
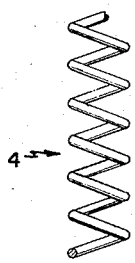
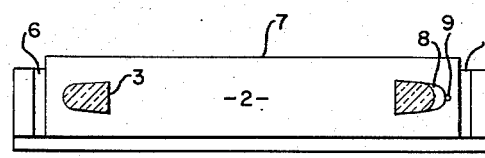
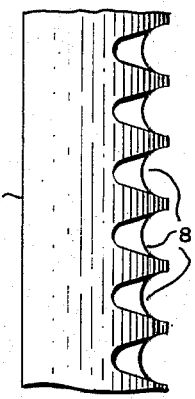
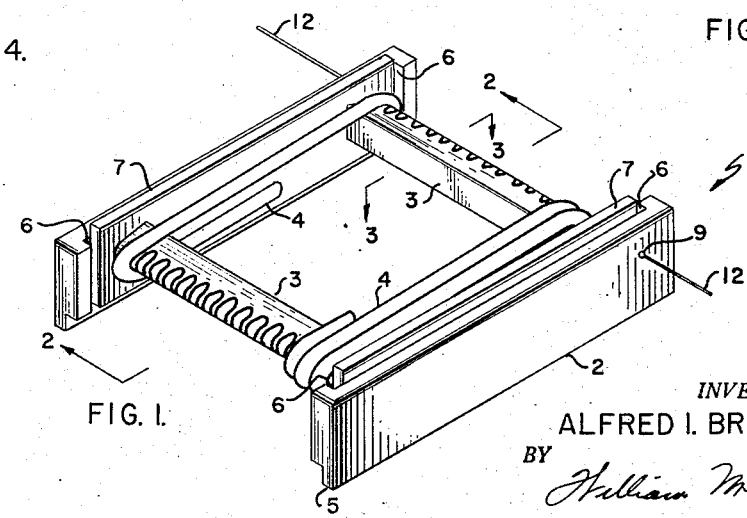
INVENTOR.
ALFRED I. BRATTON
BY
*William M Gees*
ATTORNEY Aug. 6, 1957 A. I. BRATTON 2,801,906
SUPPORT FOR WIRE FILAMENT
Filed Dec. 9, 1954 2 Sheets-Sheet 2

INVENTOR.
ALFRED I. BRATTON
BY
ATTORNEY

United States Patent Office 2,801,906
Patented Aug. 6, 1957

2,801,906

SUPPORT FOR WIRE FILAMENT

Alfred I. Bratton, Broomall, Pa., assignor to Oxy-Catalyst, Inc., a corporation of Pennsylvania Application December 9, 1954, Serial No. 474,220

3 Claims. (Cl. 23—288)

This invention relates to filaments and filament supports. It is believed that the invention will find its widest field of application in the manufacture of catalytic filaments and filament supports although the principles of the invention are applicable in other environments.

The offensive odors and smoke contained in gases such as flue gases which emanate from industrial and domestic ovens, incinerators, roasters and similar devices can often be removed by catalytic oxidation. Where such gases are purified by catalytic methods it is necessary to provide in the path of the gases a suitable catalyst arranged in such manner that an intimate and complete contact will result between the gas stream and the catalyst. It is also necessary to insure that the operating temperature of the catalyst will be maintained since, as a practical matter presently available catalysts are operative only at temperatures in the neighborhood of about 500° F. and above. The air pollution problem of many urban districts has engendered an increasing interest in catalytic oxidation as a means of eliminating the offensive components of gases from such devices as ovens, incinerators, roasters, etc. which are responsible in part for the nuisance.

An advantageous method of supporting the catalyst for a gas purification process consists of providing a filament in the form of a wire and coating this filament with catalytic material. Such filaments can be provided with relatively small cross-sectional areas and therefore relatively large surface to volume ratios. This is advantageous in that a relatively large catalytic surface can be provided within a relatively small space. Wire filaments offer further advantages in that adjacent strands of the filament can be closely spaced thereby assuring intimate and complete contacting of the gases by the catalyst with resulting complete cleanup. Finally, with a filament supported catalyst, the necessary operating temperature can be achieved and maintained with comparative ease for the reason that a relatively small diameter wire having a low mass can be quickly heated to the operating temperature of the catalyst with the expenditure of only a minimum amount of heat. The heat required for raising the temperature of the catalyst may be supplied either from an extraneous source or from the gases being purified and from the oxidation reactions which take place. Where the heat is supplied from an extraneous source to a filament supported catalyst (as is frequently necessary with low temperature gases having relatively low concentrations of odors, smoke and other combustible components), it is merely necessary to pass an electric current through the catalyst to thereby develop the heat required.

It is an object of the instant invention to provide an improved filament support for a catalytic filament.

It is a further object of the invention to provide a filament support which is amenable to stacking with at least one similar filament support to thereby provide a multiple filament unit.

It is a further object of the invention to provide a filament support and filament in which the filament strands are closely spaced.

It is a further object of the invention to provide a catalytic filament having closely spaced filament strands in which the problem of wire sagging upon heating of the filament is entirely obviated.

Further objects of the invention will be apparent from the following description and from the annexed drawings in which:

Fig. 1 is a perspective view of a preferred embodiment of a filament support and filament constructed in accordance with the principles of the invention.

Fig. 2 is a view taken along the lines 2—2 of Fig. 1.

Fig. 3 is an enlarged view of a portion of the support of Fig. 1 looking in the direction of the arrows 3—3 of Fig. 1.

Fig. 4 is an enlarged view of a segment of a helical filament of the type used in the practice of the invention.

Fig. 5 is a perspective view of a multiple filament unit composed of a plurality of stacked filament supports of the type shown in Fig. 1.

Figure 7:
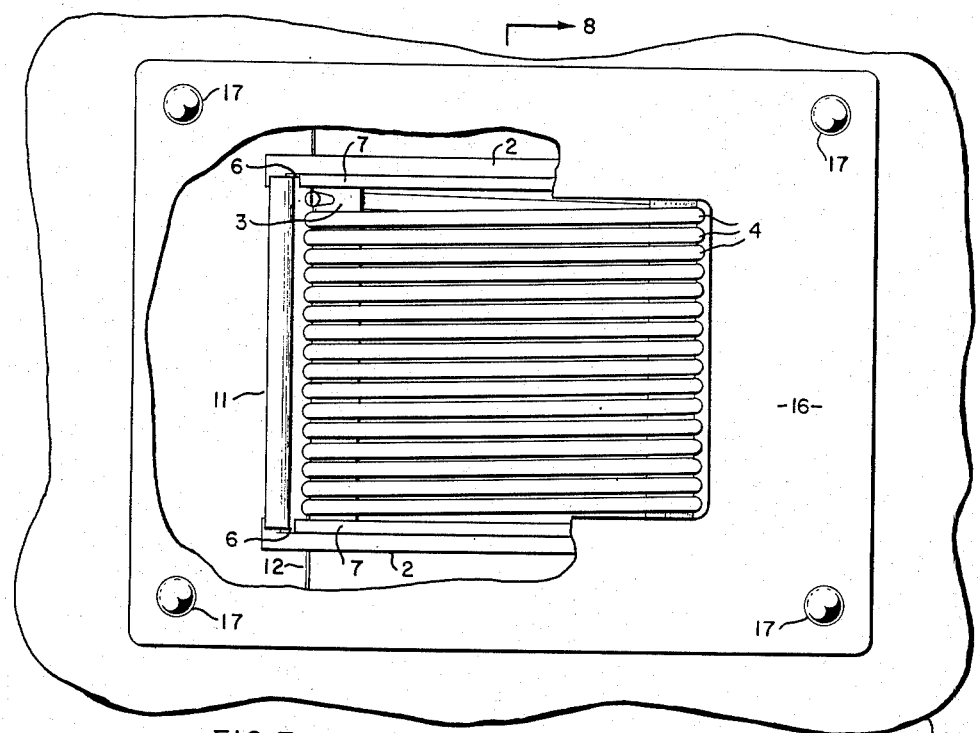
Fig. 7 is a top plan view with parts broken away showing the manner in which a multiple filament unit of the type shown in Fig. 5 might be incorporated into a conventional oven.

The provision of a catalytic filament for a stream of gases to be purified requires considerable attention to several details if successful cleanup is to be achieved. In the first place it is essential to provide a filament having sufficient catalytic surface to effect oxidation of all, or substantially all, of the objectional components in the gas stream. The amount of catalytic surface required per unit volume of gases per unit time will depend upon several factors such as the temperature of the gases, the concentration of combustibles therein, and the nature of these combustibles.

The catalytic filament must be arranged in such manner that complete contacting is achieved; in other words every part of the moving gas stream must come into contact with the catalyst if satisfactory cleanup is to be obtained. This requirement necessitates a close spacing of the filament strands as compared, for example, with the spacing of filament strands in a convection space heater. In the design of such space heaters only a portion of the air passing through the heater need be heated as it flows across the relatively widely spaced electric filaments since the heated air will intermix with the unheated air to yield a stream of heating air at the desired temperature. In a catalytic oxidation process, on the other hand, if the contacting is not substantially complete, the process must be termed a failure.

Finally, the provision of a catalytic filament requires some attention to the behavior of the filament at its operating temperature. When the filament is heated to its operating temperature, it tends to thermally expand and elongate. Such elongation in a filament composed of strands which are closely spaced when cold, can cause sagging with resulting opening of gaps between adjacent strands and/or short circuiting. The opening of such gaps, of course, presents an opportunity for a portion of the gases to by-pass the catalytic surface of the filament and avoid its effects while short circuiting will deactivate and possibly damage the filament. For these reasons any satisfactory catalytic filament must be so constructed that the close spacing of the strands is maintained as the filament is heated during use.

The instant invention provides a catalytic filament support and filament which, in itself, obviates the problems of by-passing and high temperature behavior outlined above. The filament consists of a helix wound as a plurality of closely spaced strands over the filament support under a slight tension. Upon heating of the filament this tension is in part relieved but at the operating temperature of the catalyst it is sufficient to maintain the spacing of the strands and thereby avoid sagging or short circuiting. By virtue of the fact that the filament is provided in the form of a helix, a maximum amount of catalytic surface area is provided within a confined space. Finally, the filament support of the instant invention is of such nature that it may be stacked with one or more similar filament supports to provide a multiple filament unit. By virtue of this aspect of the invention a standard filament support and filament constructed in accordance with the principles of the invention can be utilized in many different installations having widely varying requirements of catalytic surface.

These and other features of the invention will be apparent from the more detailed description of the preferred embodiment which follows.

Referring to the drawing the reference numeral 1 generally indicates a filament and filament support consisting of parallel spaced-apart side members 2, filament supporting members 3, over which a helical filament 4 is continuously wound in a plurality of side-by-side strands (only a portion of this filament being shown in the interest of clarity). The side members 2 are provided on the lower edge thereof (as viewed in Fig. 1) with a depending flange 5 extending from the outside portion of the lower edge. This flange 5 extends longitudinally of the side members 2 for the full length thereof and forms a continuation of the outwardly facing surface of the side members. Adjacent each end of the side members 2 there is provided a guide in the form of a groove 6 extending in a direction normally of the plane defined by the filament support. As is apparent from the drawing the guides 6 of the opposed faces of the side members are aligned with each other in opposed face-to-face relationship. On the upper edge of each of the side members 2 there is provided an upwardly projecting flange 7 extending in a longitudinal direction between the guides 6 at each end of the side members. As will be apparent from the description which follows the thickness of the flanges 5 and 7 is such that when two or more filament supports are stacked one on top of another the flanges 7 will fit within the flanges 5 of the filament support disposed above any single filament support.

The filament supporting members 3 provide a curved surface facing outwardly of the central portion of the support which curved surface is provided with a plurality of slots 8. The slots 8 accommodate the helically wound filament 4 and should be of such size as to firmly seat this filament and prevent lateral displacement of any of the side-by-side strands of the filament. Preferably the filament supporting members 3 and side members 2 are manufactured as an integral unit of molded and fired porcelain although, of course, the side members 2 and supporting members 3 may be molded in independent operations and later assembled to each other by for example the use of porcelain cement. While the preferred embodiment of the invention is made from a high grade porcelain it is to be understood that any suitable dielectric material having sufficient strength at the temperatures of operation of the device can be used in lieu thereof.

The filament itself shown in Fig. 4 is a continuous helix which in turn is wound over the supporting members 3 and seated in the notches 8. This arrangement provides two layers of strands, each layer in effect being composed of a plurality of side-by-side strands of helical wire providing a surface of catalytic material. The slots 8 on each of the filament supporting members 3 are provided on staggered centers with reference to the opposite filament supporting member so that when the filament 4 is wound thereover, the strands of the upper layer will be staggered or displaced relative to the lower layer of strands. This arrangement insures contacting of the catalytic filament by all portions of a gas stream flowing thereover. The helical strands of the instant invention provide a relatively large amount of catalytic surface within a relatively small space since a helix provides a considerably larger surface per unit length as measured along the axis of the helix than does a straight wire filament. As previously mentioned, the helical filament 4 is wound over filament supporting member 3 in such manner that at room temperature it will be under tension. This tension is only partially relieved when the filament is heated so that the close spacing of the strands is maintained at operating temperatures. As shown by the drawing, the strands of the filament cover substantially the entire space enclosed by side members 2 and filament supporting members 3, the strands at each side being extremely close to and almost abutting the side members 2. This prevents any by-pass of gases around the sides of the bank of strands.

The ends of this filament 12 are led through side members 3 in suitable apertures 9 where, as is usually the case, an electric heating current is required to maintain the catalyst at its operating temperature. The material of this filament is preferably 80% nickel-20% chromium alloy wire where, as in the preferred embodiment, the catalyst is provided in the form of a superficial coating in a manner which will be described below. However, it is understood that other suitable alloy wires might be employed in the case of a coated wire catalyst or, if desired, a catalytic material may be used for the entire wire thereby obviating the necessity for providing a catalytic coating.

Figure 6:
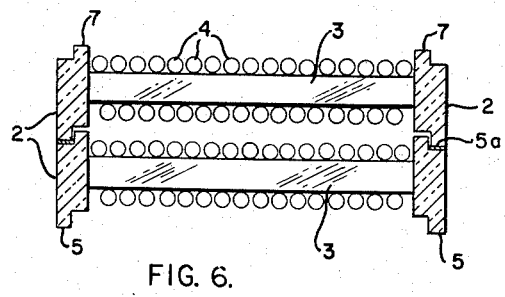
Fig. 6 is an end view showing the manner in which the filament supports nest one on top of another to produce a multiple filament unit.

Figs. 5 and 6 disclose the manner in which a plurality of filament supports of the type shown in Fig. 2 may be stacked one on top of another to provide a multiple filament unit. As shown in Fig. 6 the depending flanges 5 of each unit will overlap and straddle the upstanding flanges 7 of the unit next below. With this arrangement lateral movement of the elements of the stack is precluded in a direction parallel to the axis of the fialment supporting members 3. Preferably gasketing material 5a is interposed between the meeting surfaces to increase the bearing surface and evenly distribute the stresses imposed. In order to secure the filament supports together as a composite unit and for the further purpose of sealing the open ends of the unit there are provided end sealing and securing panels indicated by the reference numeral 10. The edges of these panels are accommodated in guideways which are formed by the individual guides 6 of the individual filament supporting units. Upon stacking a plurality of filament supports the guideways 6 of adjacent supports will be aligned with each other and the panels 10 can thereby be inserted into the opposed guideways at each end. In order to secure the filament supports together the panels 10 are provided with outturned flanges 11 at each end thereof. These flanges extend over the top surface of the side members 2 as clearly shown in Fig. 6. In constructing the multiple filament unit it is therefore merely necessary to stack the desired number of filament supports one on top of another in the manner shown in Fig. 5 and subsequently insert panels 10 into the guideways provided by the aligned guides 6 in side members 2. At least one of the flanges 11 of each panel is provided after the panel is inserted into its accommodating guideways. This is accomplished by merely bending the end of the panel over the upper surface of the side member 2.

The filament support of the instant invention can be manufactured in any desired size depending upon the contemplated uses. It has been found that where it is intended to incorporate the filament into relatively small devices such as electric space heaters, domestic ovens, domestic incinerators and the like, an advantageous size for the filament support is 3¾" x 3". With this size support the filament 4 may consist of 22 gage wire wound in the form of a helix of 0.126" diameter having a pitch of 0.081". For a filament support of this size approximately 39 feet of wire are required which will yield a substantial surface of catalyst.

Figure 8:
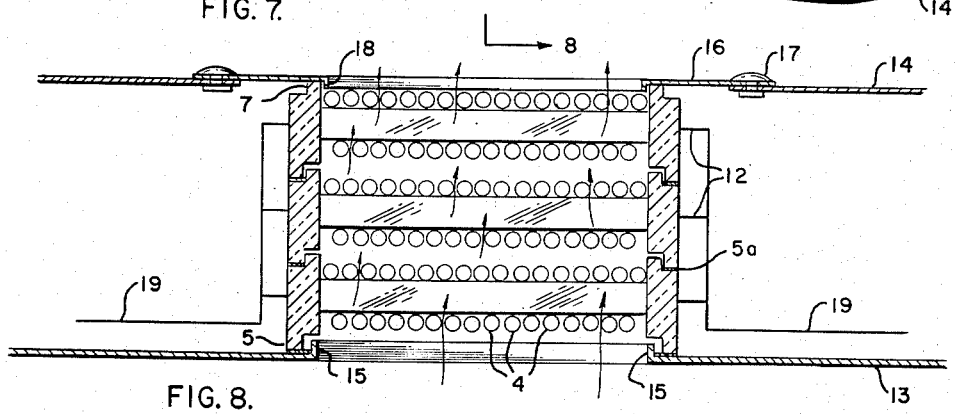
Fig. 8 is a view looking in the direction of the arrows 8—8 of Fig. 7.

Figs. 7 and 8 show the manner in which a multiple filament unit of the type shown in Fig. 5 can be incorporated into a conventional oven. In these figures 13 denotes the inner wall of the oven and 14 the outer wall thereof. Inner wall 13 is provided with a rectangular opening which is bordered by upturned flanges 15 on the edges of the inner wall. The size of this opening is such that the depending flanges 5 of the lowermost filament supporting member of the filament supporting unit straddle the flanges 15 on two of the opposed edges of the inner wall 13 as clearly shown in Fig. 8. The remaining two flanges of the inner wall 13 are straddled by the opposed end panels 10 of the filament supporting unit. By virtue of this arrangement all of the gases which pass upwardly through the unit from the interior of the oven (as indicated by the arrows) are forced to flow across the filaments 4 of the unit.

Outer wall 14 is provided with an opening aligned with, but considerably larger than, the opening of inner wall 13. This opening in outer 14 is partially covered by a centrally apertured coverplate 16 removably secured to outer wall 14 by fasteners 17. The central aperture of coverplate 16 is bordered by depending flanges 18 which, as shown in Fig. 8, fit within the open central space of the uppermost filament support of the multiple filament unit. The flanges 18 perform a function similar to that of the flanges 15 in assuring contacting between all of the gases passing out of the oven and the catalytic filaments of the unit. As previously explained, the unit itself is sealed by virtue of the interfitting flanges 5, 7 thereof and the end panels 10.

The leads 12 of the individual catalytic filament supports of the unit are suitably connected to electrical conductors which, of course, are in turn connected to a suitable voltage source. In the disclosed embodiment all of the individual filament supports are connected in parallel although alternative arrangements might prove desirable under some circumstances.

The disclosed arrangement of Figs. 7 and 8 provides a convenient method of incorporating the catalytic unit into an oven or similar device. The removable coverplate 16 permits expeditious removal of the unit for inspection or repairs should the need arise. In the disclosed arrangement a catalytic unit consisting of three individual filament supports is shown although the number of individual filament supports can be varied in accordance with the requirements of the oven. While the disclosed arrangement shows a horizontal mounting of the multiple filament unit, it is, of course, feasible to mount the unit on its side where the particular shape or position of the flue requires.

As previously stated, the wire 4 may either be composed of catalytic material or merely superficially coated with catalytic material. It is not intended that the invention be limited to any particular catalyst or to either a coated type catalyst or a catalytic wire. However, it should be mentioned that coated type catalysts have been found to be particularly desirable in flue gas purification processes of the type to which the instant invention is adapted. More particularly it should be stated that satisfactory results can be obtained by coating a filament wire of 80% nickel-20% chrome, as previously mentioned, with a catalytic form of an inorganic oxide or mixture of such oxides and subsequently impregnating this coating with a suitable metallic catalyst. Catalysts of this type are described fully in the copending application of Eugene J. Houdry and William M. Adey, Serial Number 366,057, filed July 3, 1953, and now abandoned, for catalytic structure. In particular, it has been found that mixtures of alumina with beryllia or alumina with zirconia impregnated with platinum have been found satisfactory. Coatings of this type provide films of superior hardness and adherence on smooth metallic surfaces such as the metallic filament of the instrument mentioned. The film of catalytically active oxide provides an excellent base or carrier for finely divided catalytically active metals to produce catalytic structures of outstanding properties. These films are extremely thin, usually in the range of about 0.0015" to about 0.005", a preferred thickness being about 0.003". However, they are none the less extremely durable and relatively adherent even under repeated temperature changes such as takes place in an intermittently used catalyst.

While preferred embodiments of this invention have been shown and described obvious modifications thereof within the scope of the appended claims will be apparent to those skilled in the art. It is contemplated for example that interfitting portions on the filament support members other than the flanges 5, 6 shown in the drawings might be provided. If desired these surfaces which abut each other when a plurality of filaments support members are stacked may merely be provided with bevels complementary to each other. Such bevels on the surfaces while perhaps not as firm and not as secure as the disclosed embodiment might under many circumstances prove satisfactory particularly if a high grade porcelain cement is used therebetween. It is contemplated also that the inventive features of the filament supporting framework might be utilized with other than helical filaments. While helical filaments provide distinct advantages for most circumstances ordinary wire strands closely spaced, have been found satisfactory in some installations.

Other obvious modifications will be apparent to those skilled in the art.

I claim:

1. Catalytic unit adapted to be stacked with at least one similar unit to provide a multiple unit assembly, said unit comprising a generally rectangular frame formed by parallel side members and parallel end members, said end members serving as supports for a filament providing a surface of catalytic material, said filament being wrapped continuously around said end members in closely spaced convolutions to provide a double layer of closely spaced strands over substantially the entire area enclosed by said rectangular frame, said side members having upper and lower edges adapted to engage the corresponding edges of side members of similar units, said edges projecting beyond the upper and lower surfaces respectively of said double layer of strands such that on stacking of said units the filament layers of adjacent units are spaced from one another while said side members form two sides of a continuous conduit enclosing the stacked filament layers, said side members having portions thereof projecting beyond said end members, said projecting portions being provided with guideways extending in a direction normal to said filament layers for receiving panels positioned in close proximity to said end members, said panels forming when said units are stacked the remaining two sides of a continuous conduit enclosing said stacked filament layers whereby reactants flowing through said conduit are brought into uniform contact with said catalytic filaments with a minimum of by-passing.

2. A multiple unit catalytic assembly for carrying out contacting operations each unit of said assembly comprising a generally rectangular frame formed by parallel side members and parallel end members, said end members serving as supports for a filament providing a surface of catalytic material, said filament being wrapped continuously around said end members in closely spaced convolutions to provide a double layer of closely spaced strands over substantially the entire area enclosed by said rectangular frame, the side members of each unit having upper and lower edges adapted to engage the corresponding edges of side members of similar units, said edges projecting beyond the upper and lower edges respectively of said double layer of strands such that on stacking of said units to form a multiple unit assembly, the filament layers of adjacent units are spaced from one another while said side members form two sides of a continuous conduit enclosing the stacked filament layers, said side members of each unit having portions thereof projecting beyond said end members, said projecting portions being provided with guideways extending in a direction normal to said filament layers, said guideways being aligned with one another in said assembly for receiving panels fitting in close proximity to said end members, said panels forming the remaining two sides of a continuous conduit enclosing the stacked filament layers whereby reactants flowing through the conduit formed by the multiple unit assembly are brought into uniform contact with the layers of catalytic filaments contained therein with a minimum of by-passing.

3. A multiple unit catalytic assembly in accordance with claim 2 including means associated with said panels for locking together the stacked units of said assembly.

References Cited in the file of this patent

UNITED STATES PATENTS

| | | |
|---|---|---|
| 738,980 | Bradley | Sept. 15, 1903 |
| 749,404 | Smith | Jan. 12, 1904 |
| 752,165 | Hasenbach | Feb. 16, 1904 |
| 1,193,799 | Landis | Aug. 8, 1916 |
| 1,895,323 | Hauf | Jan. 24, 1933 |